United States Patent
Du et al.

(10) Patent No.: US 8,325,672 B2
(45) Date of Patent: Dec. 4, 2012

(54) METHOD AND SYSTEM FOR SEAMLESS HANDOVER BETWEEN WLAN AND WWAN (75) Inventors: Yonggang Du, Shanghai (CN); Xiaoling Shao, Shanghai (CN); Xiaohui Jin, Shanghai (CN); Lei Feng, Shanghai (CN); Bo Liu, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 458 days.

(21) Appl. No.: 10/578,932

(22) PCT Filed: Nov. 3, 2004

(86) PCT No.: PCT/IB2004/052276
§ 371 (c)(1),
(2), (4) Date: May 8, 2006

(87) PCT Pub. No.: WO2005/046280
PCT Pub. Date: May 19, 2005

(65) Prior Publication Data
US 2007/0087748 A1    Apr. 19, 2007

(30) Foreign Application Priority Data
Nov. 10, 2003    (CN) .......................... 2003 1 0115657

(51) Int. Cl.
*H04W 4/00*    (2009.01)
(52) U.S. Cl. ....................... 370/331; 455/436
(58) Field of Classification Search .................. 370/331; 455/436
See application file for complete search history.

(56) References Cited

U.S. PATENT DOCUMENTS

| | | | | |
|---|---|---|---|---|
| 6,711,147 | B1* | 3/2004 | Barnes et al. ................. | 370/338 |
| 7,010,300 | B1* | 3/2006 | Jones et al. .................... | 455/439 |
| 7,849,173 | B1* | 12/2010 | Uhlik ............................ | 709/223 |
| 2003/0065817 | A1* | 4/2003 | Benchetrit et al. ............ | 709/245 |
| 2003/0134636 | A1 | 7/2003 | Sundar et al. | |
| 2003/0134650 | A1* | 7/2003 | Sundar et al. ................. | 455/465 |
| 2003/0169713 | A1 | 9/2003 | Luo | |
| 2004/0114553 | A1* | 6/2004 | Jiang et al. .................... | 370/328 |
| 2005/0053034 | A1* | 3/2005 | Chiueh .......................... | 370/331 |
| 2005/0243820 | A1* | 11/2005 | Chen ............................ | 370/389 |

FOREIGN PATENT DOCUMENTS

| | | |
|---|---|---|
| JP | 2001507897 | 6/2001 |
| JP | 2003501972 | 1/2003 |
| JP | 2003125433 | 4/2003 |
| JP | 2003235065 | 8/2003 |
| WO | 9831169 | 7/1998 |
| WO | 0076234 | 12/2000 |
| WO | 03092218 | 11/2003 |

* cited by examiner

Primary Examiner — Marcos Batista (57) ABSTRACT

A communication method for a mobile terminal to perform seamless handover between a WWAN and a WLAN. The method comprises receiving a registration message sent by the mobile terminal when it enters the WLAN, wherein the registration message at least contains a WLAN address that the mobile terminal acquires when entering the WLAN; establishing the mapping relationship between the WWAN address and the WLAN address of the mobile terminal according to the registration message; encapsulating the WLAN address into the data information to be sent to the mobile terminal according to the mapping relationship when receiving the data information to be sent to the mobile terminal from a source address; and sending the data information containing the WLAN address to the mobile terminal via the WLAN.

20 Claims, 9 Drawing Sheets

| MT index (or MSISDN) | $IP_{gprs}$ | $IP_{wlan}$ |
|---|---|---|
| 1 | 130.23.3.7 | Invalid address (means MT out of WLAN) |
| 2 | 130.23.3.8 | 202.1.2.100 |
| ... | ... | |

Fig. 6

From MT to MSM:

| | Source IP | DEST IP | IP payload |
|---|---|---|---|
| | IPgprs | IPapp-srv | IP payload |

Fig. 7A

From MSM to MT:

| | Source IP | DEST IP | IP payload |
|---|---|---|---|
| | IPapp-srv | IPgprs | IP payload |

METHOD AND SYSTEM FOR SEAMLESS HANDOVER BETWEEN WLAN AND WWAN

FIELD OF THE INVENTION

The present invention relates generally to a communication method and apparatus, and more particularly, to a communication method and apparatus for mobile terminals to handover seamlessly between Wireless Wide Area Network (WWAN) and Wireless Local Area Network (WLAN).

BACKGROUND OF THE INVENTION

WLAN is a flexible data communication system, usually deployed in so-called hotspots, such as airports and hotels, to provide high-speed data services. People can use wireless terminals, such as mobile phones or laptops, via wireless access, to access the network resources in a WLAN, and the resources on Internet connected with the WLAN.

WWAN is a communication system with broader coverage range, and is deployed to provide voice and low-speed data services. For example, Global System for Mobile Communication (GSM), General Packet Radio Service (GPRS), Code Division Multiple Access (CDMA) and Third-Generation Mobile Communication (3G) systems all fall in the category of WWAN.

With development of communication technologies, people put forward more and higher requirements for wireless communication systems. When a WWAN user enters into the area covered by WLAN, the user will hope to enjoy the high-speed data service offered by WLAN. On the other hand, when a WLAN user leaves the WLAN coverage area, he/she may also hope to get support from WWAN services. How to integrate high-speed data transfer of WLAN with the broader coverage range of WWAN, is increasingly becoming a hot R&D issue in wireless communications.

Figure 1:
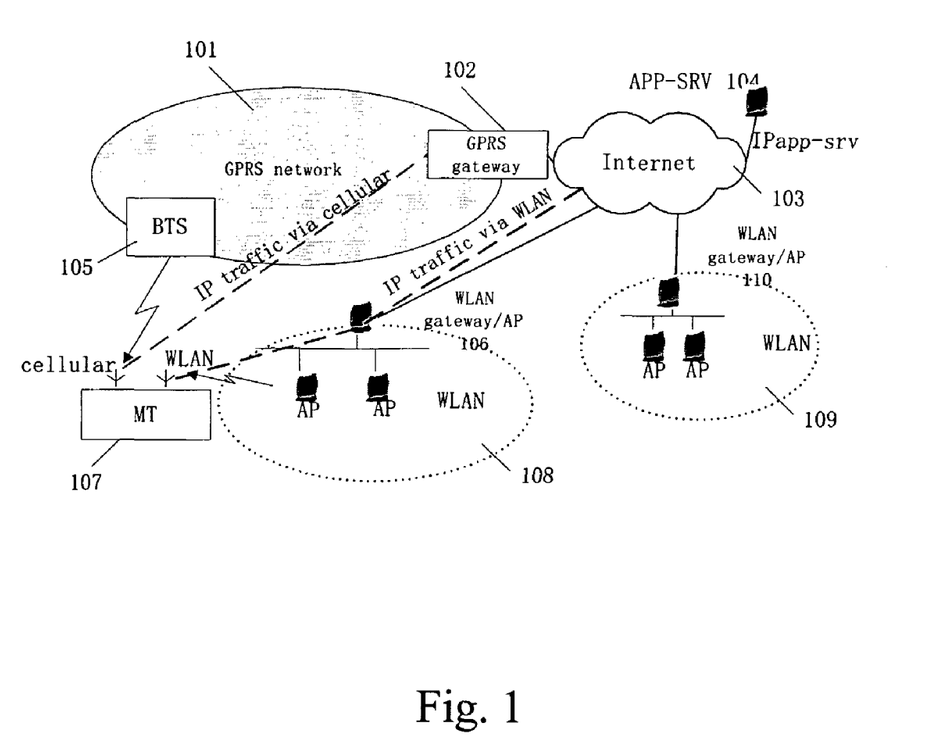
FIG. 1 is a schematic diagram illustrating a mobile terminal with WWAN and WLAN interfaces communicates with the Internet via WWAN and WLAN respectively.

FIG. 1 shows the wireless communication in the network integrating WLAN and WWAN in accordance with the above user requirements. As the figure illustrates, when a MT (mobile terminal) 107 equipped with WLAN interface and WWAN interface is going to access the network resources in Internet, if MT 107 is in a hotspot area covered by WLAN 108, it can access the Internet with high-speed via WLAN interface, through the gateway/AP 106 of WLAN 108 (as the thick dashed line in FIG. 1 shows). If MT 107 is out of WLAN 108 and is not in other WLAN coverage areas, it will handover to use WWAN interface, and access the Internet through base station 105, via gateway 102 in the WWAN (as the thin dashed line in FIG. 1 shows).

Users can enjoy better service provided by the wireless network systems, through handover between WLAN and WWAN interfaces, by adopting the communication mode of FIG. 1. However, referring to the communication in FIG. 1, when MT 107 leaves WLAN 108 and enters into WLAN 109, its WLAN address will change, so a precondition for ensuring the ongoing communication not terminated is how to let the other communicating party know the changed WLAN address. An optional scheme is to upgrade the network systems of WLAN 108 and WLAN 109, so that when the MT enters into a WLAN from another WLAN, the network system of the old WLAN can obtain the MT's new WLAN address from the network system of the new WLAN and forwards the data intended to the old WLAN address to the new WLAN address, and thus the communication can go on. But each WLAN network system has to be modified when this scheme is adopted. For each WLAN network system run by different network operators, this will not only lead to increase of system overhead cost, but also have some difficulty and resistance in practicability.

SUMMARY OF THE INVENTION

An object of the present invention is to provide a communication method and apparatus for use in wireless communication systems composed of WWAN and WLAN, so that a mobile terminal can handover seamlessly between a WWAN and a WLAN.

A communication method is proposed in the present invention to be performed by a WWAN network system, allowing a mobile terminal with a WWAN address in the WWAN to handover between the WWAN and a WLAN, comprising steps of: receiving a registration report sent by the mobile terminal when it enters the WLAN, wherein the registration report at least includes a WLAN address that the mobile terminal acquires when entering the WLAN; establishing mapping relationship between the WWAN address and the WLAN address of the mobile terminal, according to the registration report.

When receiving data information to be sent to said mobile terminal from a source address, encapsulating said WLAN address into the data information to be sent to said mobile terminal according to the mapping relationship between said WWAN address and said WLAN address; sending the data information containing said WLAN address to said mobile terminal via said WLAN.

When receiving the data information containing said WLAN address sent by said mobile terminal to a destination address via said WLAN, unpacking said data information containing said WLAN address and sending the unpacked data information to said destination address.

A communication method is proposed in the present invention to be performed by a mobile terminal, allowing the mobile terminal to handover between a WWAN and a WLAN, comprising steps of: acquiring a WLAN address when the mobile terminal with a WWAN address in the WWAN enters the WLAN; sending a registration report to the WWAN network system, wherein the registration report at least includes the WLAN address.

Receiving the data information containing said WLAN address transferred via said WWAN network system from a source address, wherein said WLAN address is encapsulated in the data information by said WWAN network system; unpacking the received data information so as to get the original data information from said source address.

Encapsulating said WLAN address into the data information to be sent to a destination address; sending the data information containing said WLAN address to said WWAN network system, so as to send the data information unpacked by said WWAN network system to said destination address.

BRIEF DESCRIPTION OF THE DRAWINGS

For a detailed description of the preferred embodiments of the invention, reference will now be made to the accompanying drawings in which.

DETAILED DESCRIPTION OF THE INVENTION

The GPRS network in WWAN networks will be exemplified to describe the proposed method for a mobile terminal (MT) to handover seamlessly between WWAN and WLAN in a communication system composed of a WWAN and a WLAN.

Figure 2:
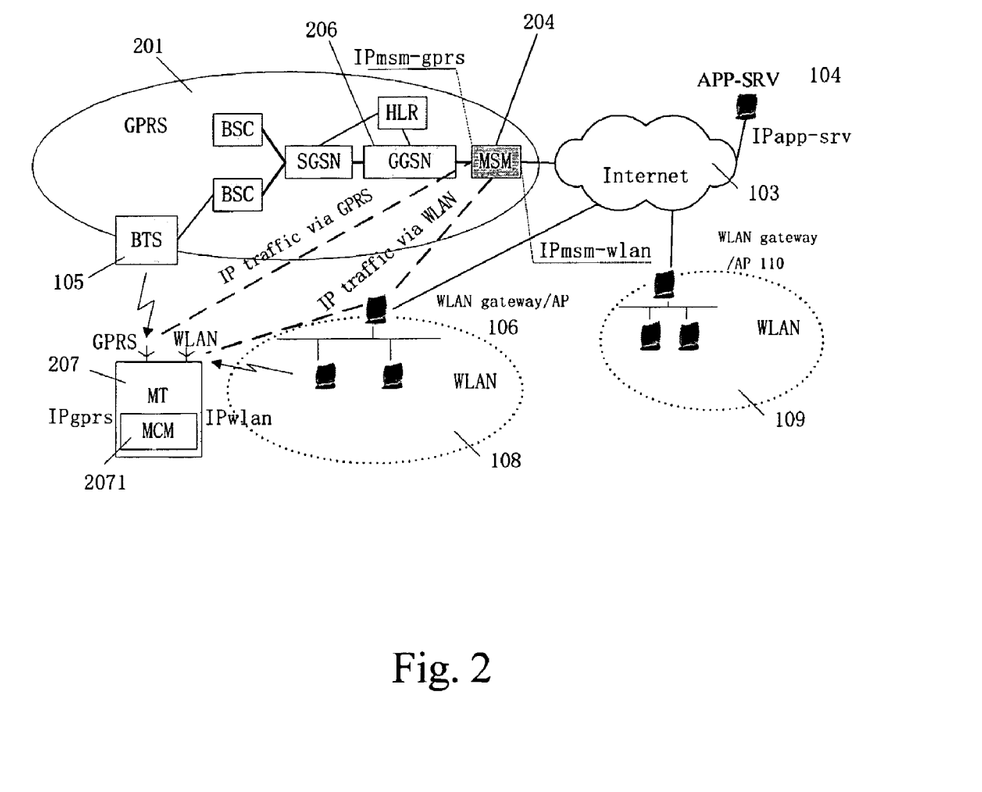
FIG. 2 is a schematic diagram illustrating the present invention applied in GPRS/WLAN integrated communication system.

FIG. 2 shows a communication system composed of GPRS 201, WLAN 108 and WLAN 109 in accordance with the present invention, wherein a MSM (Mobility Supporting Module) 204 is added into the GPRS network, the MSM 204 can be an expansion module of GGSN (Gateway GPRS Supporting Node) 206, or installed as a standalone server on the link between GSN 206 and Internet 103. When as an expansion module, MSM 204 may have the same address (IP address, for exam pie) as GGSN 206; while as a standalone server, MSM 204 needs two Internet addresses, that is, IPmsm-wlan and IPmsm-gprs. MSM 204 can connect with Internet 103 via IPmsm-wlan, and connect with other modules in the GPRS network via IPmsm-gprs.

Figure 3:
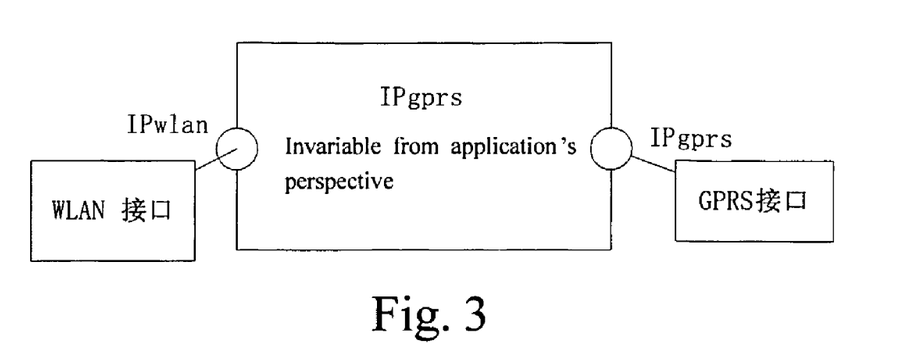
FIG. 3 is a schematic diagram illustrating the IP addresses on the mobile terminal with GPRS/WLAN modes in the present invention when facing different network interfaces.

In FIG. 2, the newly added MSM 204, WLAN 108 and WLAN 109 are connected with APP-SRV 104 in Internet 103 respectively via MSM 204, WLAN gateway/AP 106 and WLAN gateway/AP 110, wherein the IP address of APP-SRV 104 in Internet 103 is IPapp-srv. When a MT 107 with GPRS and WLAN interfaces attempts to communicate with APP-SRV 104 in Internet 103, if MT 207 is in WLAN 108, it will access APP-SRV 104 whose IP address is IPapp-srv, through WLAN gateway/AP 106 by using the WLAN address IPwlan acquired in WLAN 108; if MT 207 fal ls beyond the WLAN coverage area, it can access APP-SRV 104 whose IP address is IPapp-srv through GGSN via its WWAN interface, by using the GPRS address IPGPRS acquired in GPRS 201. GPRS network can cover not only the WLAN area, but also almost all areas beyond the WLAN, so, from the perspective of application layer, MT 207 has an invariable address IPgprs in GPRS while its WLAN address IPwlan will change with its entry to different WLANs. FIG. 3 displays the mapping relationship between two interfaces of the MT and their corresponding addresses.

In the communication system shown in FIG. 2, according to the communication method of the present invention, MT 207 can be considered as a mobile node, the GPRS network can be considered as a home link network, WLAN 108 and WLAN 109 can be considered as two outer link networks. Accordingly, the address IPgprs of MT 207 in GPRS can be considered as its home IP address, and the address IPwlan of MT 207 in WLAN 108 can be considered as its care-of-address in the outer link network WLAN 108. The newly added MSM 204 in GPRS network can be considered as home agent (HA).

During communication, when a mobile node in outer link is receiving data, the HA can intercept the IP packet whose destination address is the home IP address of the mobile node (termed as source packet later) in the midway, and re-encapsulates the source packet at network layer. The destination IP address of the re-encapsulated IP packet is the care-of-address of the mobile node, and its payload is the intercepted source packet. The technique for re-encapsulating IP packets by using the care-of-address is called tunneling technique. Then, the HA forwards the re-encapsulated IP packet to the network, and the router/gateway on outer link chooses a suitable route to forward the packet to the mobile node after receiving the tunneled packet sent to the mobile node by the HA. After receiving the packet, the mobile node unpacks the packet to get the original source packet.

When a mobile node on outer link is transmitting data, it will first choose a router/gateway as its default router, and then transmit data by using the default router. To make the upper-layer applications independent of network connection changes, the mobile node can process the out-going packet with reverse tunneling technique. The so-called reverse tunneling means that the mobile node re-encapsulates and transmits the IP packet that is to be sent by it (the source address is the home IP address of the mobile node and the destination address is the IP address of the destination computer). The source address of the re-capsulated IP packet is the care-of-address of the mobile node and the destination address is the IP address of the HA. The HA will receive and unpack the packet, and transmit the obtained source IP packet to the destination computer.

With particular reference to FIG. 2, all packets to be sent to MT 207 (with home IP address IPgprs of MT 207 as the destination address) will first be sent to MSM 204. If in MSM 204 there is a record for the car e-of-address IPwlan of MT 207 in its WLAN, MSM 204 will re-encapsulates the packet by using the care-of-address IPwlan (i.e. tunneling technique). Then, MSM 204 forwards the re-encapsulated packet to the gateway/AP of the WLAN where MT 207 settles, and routes to MT 207 via the gateway/AP of the WLAN. When MT 207 in the WLAN attempts to transmit data to the Internet, it will re-encapsulate the source packet to be transmitted by using its care-of-address IPwlan in the WLAN (i.e. reverse tunneling), and transmit the re-encapsulated packet to MSM 204 via the gateway/AP of the WLAN. MSM 204 will receive and unpack the packet, and forward the source packet to the Internet.

It can be seen from the above description that, when MT 207 communicating with the Internet handovers between GPRS network and WLAN (such as WLAN 108), the communication between MT 207 and the Internet can be translated into communication between MT 207 and MSM 204.

The communication information between MT 207 and MSM 204 can be classified into two types: one is control messages, for MT 207 to send registration report and canceling registration report to MSM 204, and for MSM 204 to send response message, such as registration success, to MT 207, so that MSM 204 can successfully establish/delete the mapping relationship between the home IP address IPgprs and the care-of-address IPwlan of MT 207; another is data traffic, for carrying the data packet sent by MT 207 to the Internet via MSM 204 and receiving packets from the Internet via MSM 204.

The following descriptions will be respectively given to the protocols for supporting transfer of control messages and data traffic between MT 207 and MSM 204, and the detailed procedure for transferring control messages and data traffic between MT 207 and MSM 204 when MT 207 is respectively in GPRS and WLAN, in conjunction with accompanying figures.

I. Transferring Control Messages Between MT 207 and MSM 204

In this invention, control messages sent to MSM 204 from MT 207, such as registration report, canceling registration report and so on, are accomplished by MCM (Mobility Control Module) 2071 in MT 207.

1. When MT 207 is in GPRS Network (1) Registration Report

When trying to access GPRS network, MT 207 first acquires a GPRS address IPgprs assigned by the GPRS network. As described above, the GPRS address IPgprs can be considered as an invariable address assigned to MT 207 and irrelevant to the network where MT 207 settles. Then, MT 207 sends a registration report containing the GPRS address IPgprs of MT 207 to MSM 204. But at this moment, MT 207 is not in WLAN, so the care-of-address IPwlan of MT 207 in the registration report will be an invalid one (for example 0.0.0.0).

After receiving the registration report from MT 207, MSM 204 will add an entry about MT 207 into the mapping table. In this entry, the GPRS address corresponding to the MSISDN of MT 207 is IPgprs, and the WLAN address is an invalid address 0. Afterwards, MSM 204 sends back a response message about successful registration to MT 207.

Figure 4A:
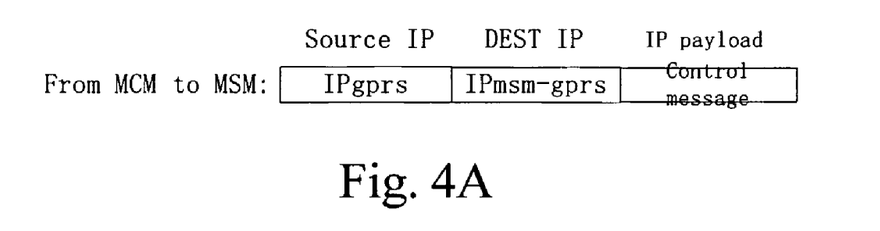
FIG. 4A and FIG. 4B illustrate the packet structure when control messages are transferred between the mobile terminal in GPRS network and the GPRS network system in accordance with the present invention.
Figure 4B:
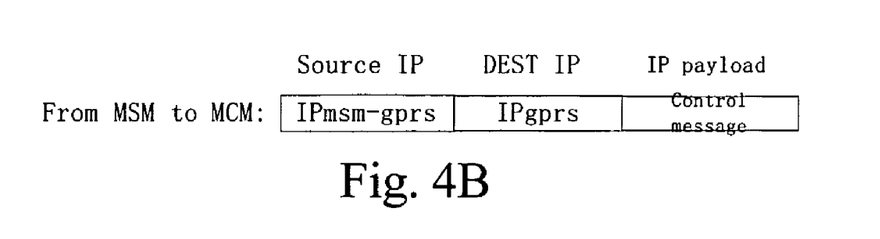

FIG. 4A and FIG. 4B illustrates the packet structures for the above control message sent to MSM 204 by MCM 2071 in MT 207 and that sent to MCM 2071 by MSM 204.

When MCM 2071 sends registration report to MSM 204, the source IP address for the packet is the GPRS address IPgprs, the destination address is the GPRS address IPmsm-gprs connected with the Internet use d by MSM 204 when acting as the HA, and the control message field is the content of the control message to be sent, as shown in FIG. 4A. When MSM 204 sends registration success response message to MCM 2071, in contrast with the registration report sent by M CM 2071 to MSM 204, GPRS address IPmsm-gprs should be taken as the source IP address and GPRS address IPgprs should be taken as the destination address of the packet, as shown in FIG. 4B.

(2) Canceling Registration Report

Same as the mechanism of sending registration report, when MT 207 detects that WLAN signals are getting worse to be not qualified for carrying traffic through WLAN interface, it will send a message for canceling registration report to MSM 204 by using the structure shown in FIG. 4A, for MSM 204 to delete the mapping relationship between the GPRS address IPgprs and the WLAN address IPwlan of MT 207 in the mapping table (or set the WLAN address IPwlan of MT 207 in the mapping table as a invalid one). Thus, MT 207 can handover to carry out data services via the GPRS interface.

2. When MT 207 is in WLAN 108

When MT 207 enters into a coverage area of WLAN (such as WLAN 108), it first obtains a WLAN address IPwlan assigned by WLAN 108. Then, MT 207 sends a registration report to MSM 204, and the registration report includes the care-of-address IPwlan about MT 207 (for example, the IP address of IPwlan is 202.1.2.100).

After receiving the registration report from MT 207, MSM 204 adds or updates the entry about MT 207, and the WLAN address of MT 207 in the entry is updated as IPwlan. Afterwards, MSM 204 sends back a response message about successful registration to MT 207.

The above registration report message sent to MSM 204 by MCM 2071 in MT 207 in the WLAN and the registration success message sent to MCM 2071 by MSM 204, are still delivered through GPRS network (for a mobile terminal to handover between WLAN and GPRS, the delivery of control signaling is still done through GPRS network), so the packet structures can still be illustrated in FIG. 4A and FIG. 4B.

When MCM 2071 sends a registration report containing the care-of-address of MT 207 (that is, IPwlan of MT 207 in WLAN 108) to MSM 204, MCM 2071 still uses the invariable GPRS address IPgprs of MT 207 as the source IP address of the source packet an d the GPRS address IPmsm-gprs between MSM 204 and the Internet as the destination address, and the control message field is the content of the control message containing the care-of-address of MT 207.

When MSM 204 sends back the response message about successful registration to MCM 2071, contrary to the registration report sent by MCM 2071 to MSM 204, the source packet uses GPRS address IPmsm-gprs as its source IP address and the invariable GPRS address IPgprs of MT 207 as its destination address, and the control message field is the response message for confirming that MSM has successfully registered the WLAN address of the MT.

Figure 5A:
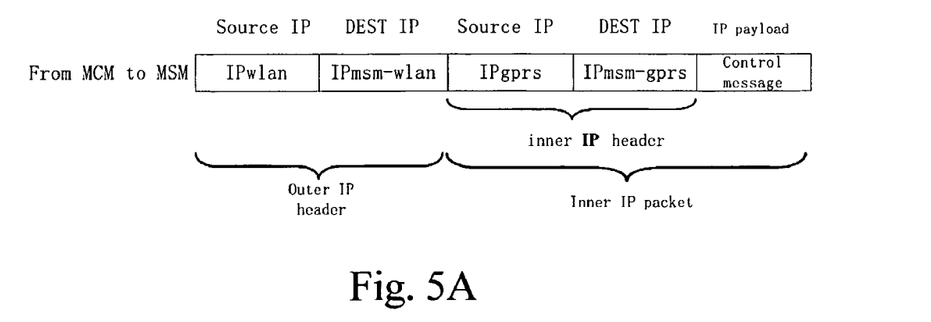
FIG. 5A and FIG. 5B illustrate the packet structure when control messages are transferred between the mobile terminal in WLAN network and the GPRS network system in accordance with the present invention.
Figure 5B:
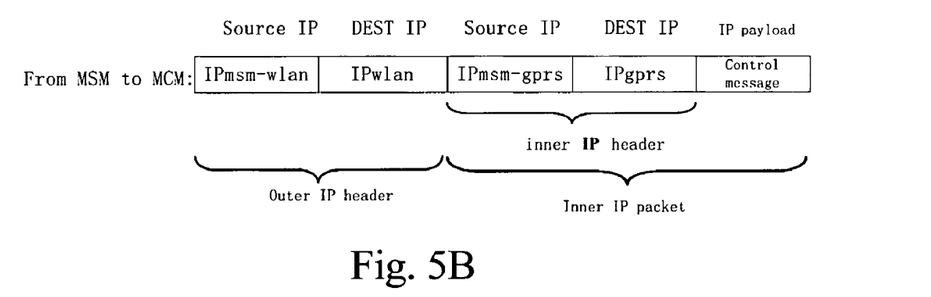

Additionally, as a complement, control message can also be delivered through WLAN, and the corresponding packet structure is show n in FIG. 5A and FIG. 5B.

To deliver the source packet identified by inner IP packet in FIG. 5A to MSM 204 via WLAN interface of MT 207 through WLAN 108, MCM 2071 can adopt reverse tunneling to re-encapsulate the source packet by using the care-of-address IPwlan of MT 207 in WLAN 108. The re-encapsulated packet has source address as IPwlan and destination address as IPmsm-wlan, as shown in the portion identified by the outer IP header in FIG. 5A, and the portion included by the inner IP header will be the content carried by the re-encapsulated packet. The source IP address IPwlan of the re-encapsulated packet has the same network prefix as that of WLAN 108, so it can be routed to MSM 204 via the gateway/AP of WLAN.

To deliver the source packet identified by inner IP packet in FIG. 5B to MT 207 from MSM 204 through WLAN, a route is needed to MT 207 via the gateway/AP 106 of WLAN 108. To transfer the source packet to MT 207 via WLAN 108, MSM 204 can adopt tunneling technique to find the care-of-address IPwlan of MT 207 by using IPgprs, according to the mapping relationship between the invariable GPRS address IPgprs and care-of-address IPwlan of MT 207 recorded in the mapping table of MSM 204, and then re-encapsulates the source packet with the care-of-address IPwlan. The re-encapsulated packet has source IP address as IPmsm-wlan and destination IP address as IPwlan, as shown in the portion identified by outer IP header in FIG. 5B, and the portion included by the inner IP header will be the content carried by the re-encapsulated packet. The destination IP address IPwlan of the re-encapsulated packet has the same network prefix as that of WLAN 108, so it can be routed to MT 207 via the gateway/AP of the WLAN.

Considering unsteadiness of the WLAN border, all control messages are delivered mainly through GPRS network, and the delivery of control signaling through WLAN only exists as a complement.

If signal transfer between MSM 204 and MT 207 is not stable, MT 207 can send registration report containing its care-of-address to MSM 204 periodically and continuously so long as MT 207 has not received the response message about successful registration from MSM 204.

Figure 6:
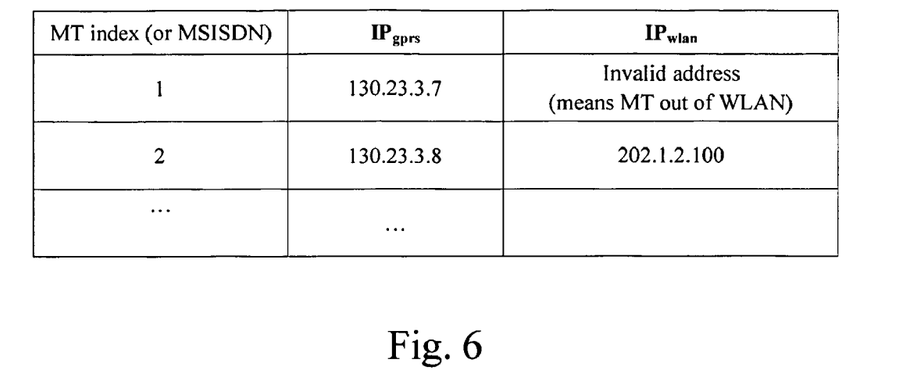
FIG. 6 illustrates the mapping table of the present invention in GPRS network systems.

FIG. 6 illustrates the entries about MT 207 in the mapping table established by MSM 204 according to the registration report sent by MT 207 when MT 207 is in GPRS network and WLAN network respectively. When MT 207 is in GPRS network, the care-of-address of MT 207 in the mapping table is an invalid one; when MT 207 is in WLAN, the care-of-address of MT 207 in the mapping table is the WLAN address of MT 207 acquired in the WLAN, such as 202.1.2.100. MT 207 sends registration report and canceling registration report to MSM 204 so that MSM 204 can timely learn and update the care-of-address of MT 207 recorded in the mapping table.

II. Transferring Data Traffic Between MT 207 and MSM 204

1. When MT 207 is in GPRS Network

When MT 207 is in the GPRS network, MT 207 can directly transfer data traffic with APP-SRV 104 in Internet 103. At this moment, MSM 204 is only a relay, for forwarding the data traffic from MT 207 with address as IPgprs to APP-SRV 104 with address as IPapp-srv, and forwarding the data traffic from APP-SRV 104 with address as IPapp-srv to MT 207 with address as IPgprs.

Figure 7A:
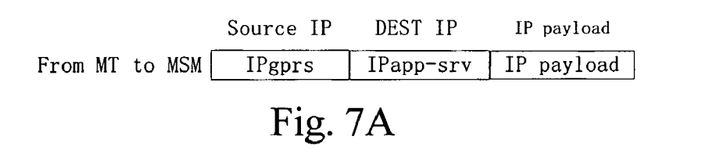
FIG. 7A and FIG. 7B illustrate the packet structure when data traffic is transferred between the mobile terminal in GPRS network and the GPRS network system in accordance with the present invention.
Figure 7B:
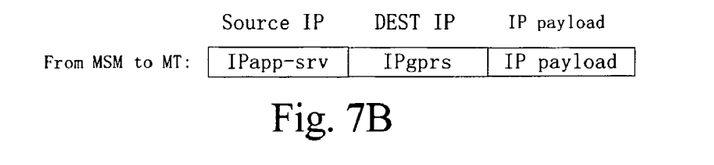

When MT 207 is in GPRS network, the structure of the packets transferred between MT 207 and APP-SRV 104 can be shown in FIG. 7A and FIG. 7B. Depending on the flow direction of data traffic, the source and destination IP addresses can use IPgprs of MT 207 in GPRS network and IPapp-srv of APP-SRV 104 respectively.

Figure 8:
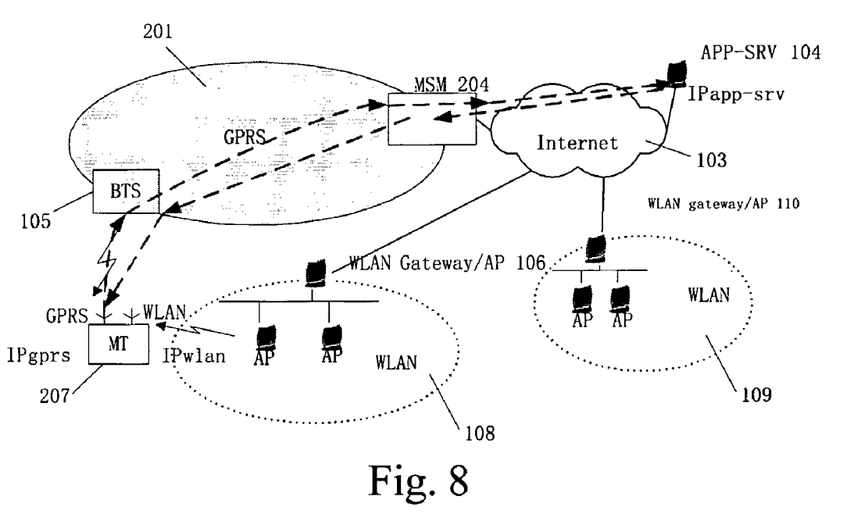
FIG. 8 illustrates how the mobile terminal in GPRS network transfers data traffic with the Internet.

FIG. 8 illustrates data traffic transfer between IPgprs of MT 207 in the GPRS network and IPapp-srv of APP-SRV 104 through the relaying of MSM 204 via GPRS interface when MT 207 is in the GPRS network, wherein the dashed line represents the procedure for MT 207 to receive/transmit data traffic. (1) When MT 207 in the GPRS network transmits data traffic to APP-SRV 104, the source IP address of the packet is IPgprs of MT 207 and IPgprs has the same network prefix as IPmsm-wlan of MSM 204, so the packet sent can be transferred to APP-SRV 104 with address as IPapp-srv through the relaying of MSM. (2) When MSM 204 as the relay receives traffic packet sent to MT 207 by APP-SRV 104, it first searches for the entry of MT 207 in the mapping table according to the destination address IPgprs of the packet. At this time, MT 207 is in the GPRS network, so the entry of MT 207 doesn't exist in the mapping table, or the WLAN address in the entry of MT 207 is an invalid one. Therefore, MS 204 knows MT 207 is in the GPRS network, and thus can forward the traffic packet to MT 207 through GPRS network.

2. When MT 207 is in WLAN 108

When MT 207 in WLAN 108 attempts to conduct data traffic communication with APP-SRV 104 in Internet 103 via WLAN through WLAN interface, it needs tunneling and reverse tunneling techniques to realize data transmission between MT 207 and APP-SRV 104 via the WLAN, which is the same as the above transmitting/receiving control messages of MT 207 in the WLAN.

Figure 9A:
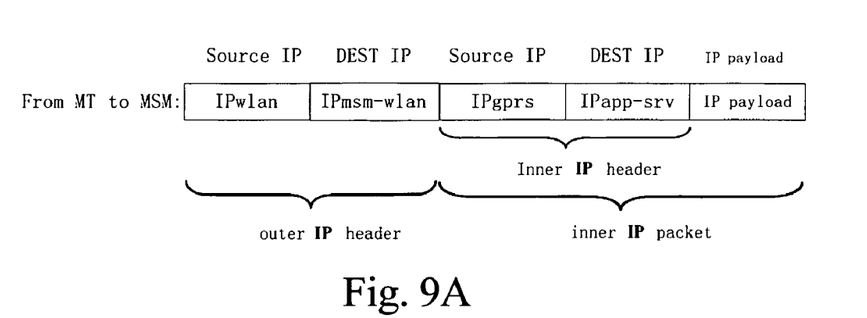
FIG. 9A and FIG. 9B illustrate the packet structure when data traffic is transferred between the mobile terminal in WLAN and the GPRS network system in accordance with the present invention.
Figure 9B:
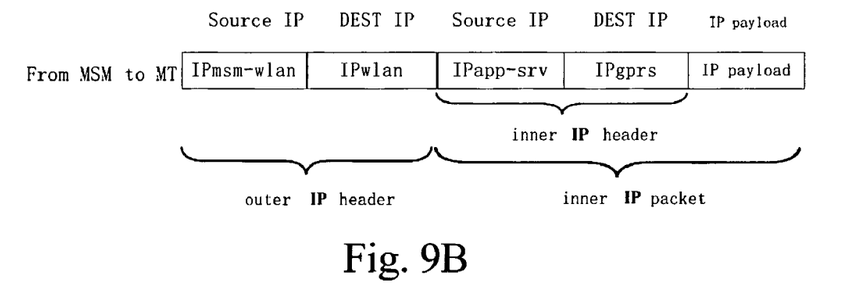

The packets containing data traffic transferred between MT 207 and APP-SRV 104 can be illustrated in FIG. 9A and FIG. 9B, similar to the packets containing control messages as shown in FIG. 5A and FIG. 5B. But data traffic is transferred between MT 207 and APP-SRV 104, while control messages are transferred between MT 207 and MSM 204, so the source/destination IP address in the source packet identified by inner IP header and the traffic content carried are different, while the corresponding source/destination IP address identified by outer IP header used when re-encapsulating is identical.

Figure 10:
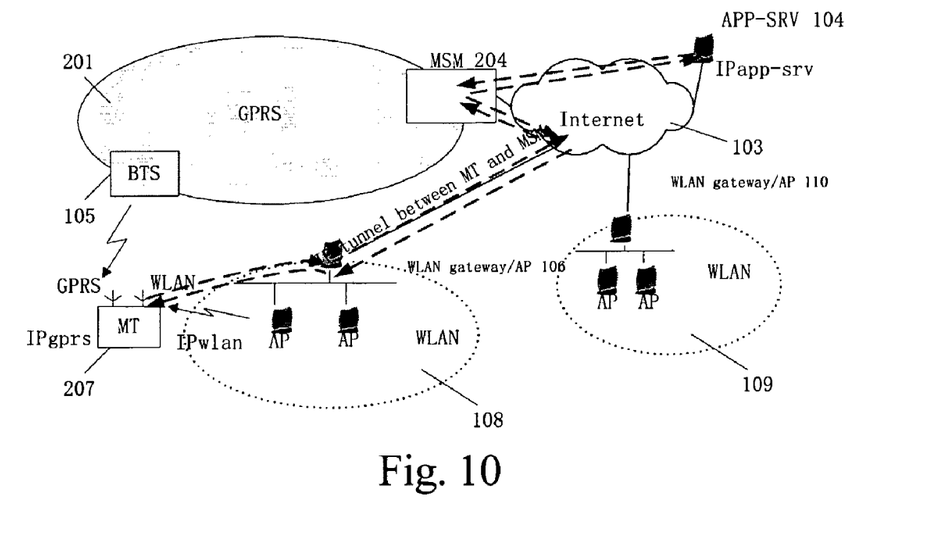
FIG. 10 illustrates how the mobile terminal in WLAN transfers data traffic with the Internet.

FIG. 10 illustrates data traffic transfer between IPwlan of MT 207 and IPapp-srv of APP-SRV 104 through the gateway/AP of WLAN 108 via WLAN interface when MT 207 is in the WLAN, wherein the dashed line represents the procedure for MT 207 to receive/transmit data traffic. (1) When MT 207 transmits data traffic, the invariable GPRS address IPgprs is needed to be used as the source IP address of the source packet and the source IP address has different network prefix from that of WLAN 108. Therefore, similar to transmission of control messages to MSM 204 by MT 207, MT 207 needs to adopt reverse tunneling to re-encapsulate the traffic packet to be transmitted by using IPwlan and IPmsm-wlan as the source and destination IP addresses, so that the re-encapsulated packet can be routed to MSM 204 through the Internet via the gateway/AP of the WLAN. MSM 204 unpacks the re-encapsulated packet, and forwards the unpacked source packet to the Internet, and the source packet can be sent to APP-SRV 104 in the Internet through the routing of the Internet. (2) When transmitting data traffic to MT 207, APP-SRV 104 needs the invariable address IPgprs of MT 207 as the destination IP address of the source packet. When MSM 204 receives the traffic packet sent to MT 207 by APP-SRV 104, MSM will search for the entry of MT 207 in the mapping table according to the destination IP address IPgprs in the packet. At this time, MT 207 is in the network of WLAN 108, so the corresponding care-of-address in the mapping table is the WLAN address IPwlan acquired when MT 207 enters into WLAN 108. MSM 204 adopts tunneling technique to re-capsulate the source packet by using the WLAN address IPwlan, and sends the re-encapsulated packet to the Internet. The destination IP address of the re-encapsulated packet is the WLAN address IPwlan of MT 207, so the re-encapsulated can be routed to MT 207 in WLAN 108 through the gateway/AP of WLAN 108. After receiving the re-encapsulated packet, MT 207 unpacks it to get the data traffic information in the source packet.

In the above description, MT 207 re-encapsulates the packet containing data traffic to be transmitted, and sends the re-encapsulated packet to MSM 204. MT 207 receives the re-encapsulated packet from MSM 204 and unpacks the re-encapsulated packet to get the data traffic information. All these operations are accomplished by MCM 2071 in MT 207.

The above functions of MSM 204 in WWAN network system and MCM 2071 in mobile terminals, can be implemented as computer software, or hardware modules with corresponding software functions, or combination of both.

Figure 11:
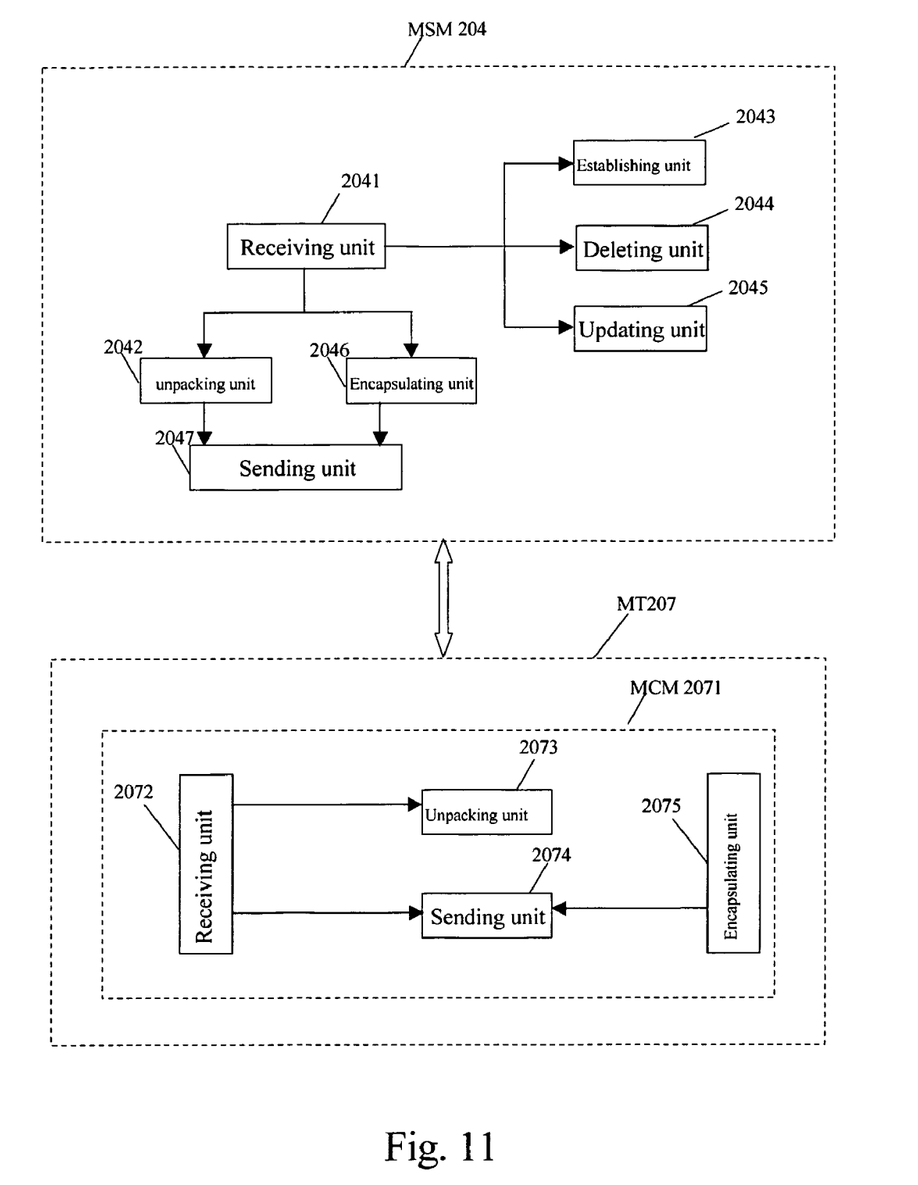
FIG. 11 is a block diagram illustrating the network system and mobile terminal implementing the handover method of the present invention as hardware modules.

When the above functions of MSM 204 in WWAN network system and MCM 2071 in MT 207 are implemented as hardware modules, FIG. 11 offers the block diagram for MT 207 and MSM 204, wherein components in MT 207 the same as those in conventional mobile terminals are not shown.

When a mobile terminal with a WWAN address in WWAN enters into the WLAN, receiving unit 2072 in MCM 2071 of the mobile terminal receives a WLAN address. Transmitting unit 2074 sends a registration report containing the received WLAN address to the WWAN network system.

Receiving unit 2041 in MSM 204 of the WWAN network system receives the registration report containing the WLAN address sent when the mobile terminal enters the WLAN. Establishing unit 2043 establishes mapping relationship between the WWAN address and WLAN address of the mobile terminal according to the registration report.

When receiving unit 2041 in the WWAN network system receives the data information to be sent to the mobile terminal from a source address, encapsulating unit 2046 encapsulates the WLAN address into the data information to be sent to the mobile terminal according to the mapping relationship between the WWAN address and the WLAN address established by establishing unit 2043. Transmitting unit 2047 sends the data information containing the WLAN address to the mobile terminal via the WLAN. After receiving unit 2072 in MCM 2071 receives the data information containing the WLAN address from the WWAN network system, unpacking unit 2073 unpacks the received data information to get the original data information from the source address.

When the mobile terminal tries to transmit data information to a destination address, encapsulating unit 2075 in MCM 2071 encapsulates the mobile terminal's WLAN address into the data information to be transmitted, then, transmitting unit 2074 transmit the data information containing the WLAN address to the WWAN network system. After receiving the data information containing the WLAN address sent to a destination address by the mobile terminal via the WLAN, receiving unit 2041 in the WWAN network system unpacks the data information containing the WLAN address, to send the unpacked data information without WLAN address to the destination address.

When the mobile terminal leaves the WLAN, transmitting unit 2074 sends a canceling registration report to the WWAN network system, to notify the WWAN network system that the mobile terminal's WLAN address is invalid. After receiving the canceling registration report from the mobile terminal, deleting unit 2044 in the WWAN network system deletes the mapping relationship between the WWAN address and the WLAN address of the mobile terminal in the network system.

When the mobile terminal enters into another WLAN, transmitting unit 2074 in the mobile terminal sends another registration report to the WWAN network system. After receiving said another registration report from the mobile terminal, updating unit 2045 in the WWAN network system updates the mapping relationship between the WWAN address and WLAN address of the mobile terminal to that between the WWAN address and said another WLAN address.

As to the mapping relationship between the WWAN address and the WLAN address established by establishing unit 2043 in the WWAN network system, it is the same as the content in the mapping table as shown in FIG. 6. The operations performed by the encapsulating unit and unpacking unit of the WWAN network system and the mobile terminal, also have the same steps as those in software implementation. The structure of the encapsulated packet can be referred to FIGS. 5A, 5B, 9A and 9B.

Beneficial Results of the Invention

Regarding to the above detailed description of the present invention, a mobile control module (MCM) and a mobile supporting module (MSM) are added into the mobile terminal and the WWAN network system respectively. When the mobile terminal enters/leaves the WLAN, it sends registration report/canceling registration report to MSM through MCM, so that MSM can timely update the mapping relationship between an invariable GPRS address and a WLAN address of the mobile terminal. Thus, when the mobile terminal in the WLAN attempts to enjoy high-speed data services via the WLAN, it can re-encapsulate the traffic packets to be transmitted through MCM, or re-encapsulate the traffic packet to be transmitted to the mobile terminal through MSM. Hence, the mobile terminal can incessantly access the network resources during handover between the WLAN and the WWAN.

It should be noted that the link established between MCM and MSM via GPRS can play the role of signaling system and carrying low-speed data traffic when the MT is not in the WLAN coverage area, as well as signaling system to transfer control messages when the MT is in a WLAN coverage area. Thus, when the MT is in WLAN areas established by different network operators, data traffic from the Internet will first be sent to the MSM over the MT's address in the GPRS network, and then be forwarded over the WLAN address of the MT registered in the MSM to the WLAN where the MT settles. Similarly, data traffic sent to the Internet by the MT, is also sent to the MSM, and then forwarded through the MSM to the application server in the Internet. Because delivery of all traffic can adopt GPRS-based network system, seamless handover and roaming between WLAN and WWAN can be achieved without all WLAN operators updating their own WLAN networks, which has special significance to WLAN/WWAN system operators. Moreover, the implementation of seamless handover and roaming between WLAN and WWAN through the GPRS network system, can guarantee network security, which has important commercial value to WLAN/WWAN system operators as well.

The present invention is applicable to mobile terminals with WWAN and WLAN interfaces to handover seamlessly, not only in communication systems composed of GPRS networks and WLAN hotspots, but also in many communication systems integrated with 3G WWAN and WLAN.

It is to be understood by those skilled in the art that the proposed communication method and apparatus for a mobile terminal to handover seamlessly between a WLAN and a WWAN as disclosed in this invention can be modified considerably without departing from the spirit and scope of the invention as defined by the appended claims.

What is claimed is:

1. A communication method performed by a WWAN network system for a mobile terminal (MT) with a WWAN address in the WWAN to bilaterally switch communication between the WWAN and a WLAN via a mobility supporting module (MSM) suitable to use with a mobility control module (MCM), the method comprising:
    receiving a registration report sent by the mobile terminal when the mobile terminal enters the WLAN, wherein the registration report at least contains a WLAN address that the mobile terminal acquires when entering the WLAN; and
    establishing a mapping relationship between the WWAN address and the WLAN address of the mobile terminal;
    wherein the mobility supporting module enables a switch between the WWAN and WLAN, dynamically updates the mapping relationship between the WWAN and WLAN based on when the mobile terminal enters or exits the WLAN, and enables the exchange of registration and/or cancellation reports between the WWAN and WLAN, either on a periodic or continuous basis, by providing updated WWAN and WLAN address information via one or more encapsulating techniques;
    wherein the mobile terminal has (i) an invariable address in WWAN and (ii) a different WLAN address with each entry into a different WLAN; and
    wherein the MCM is incorporated within the MT and the MSM is placed within the WWAN such that two types of information is exchanged between the MCM and MSM, that is, control messages including the registration and/ or cancellation reports and data traffic for carrying data packets sent by the MT to an external source via the MSM.

2. The method according to claim 1, further comprising:
receiving the data information to be sent to said mobile terminal from a source address;
encapsulating said WLAN address into the data information to be sent to said mobile terminal, according to the mapping relationship between said WWAN address and said WLAN address; and
sending the data information containing said WLAN address to said mobile terminal via said WLAN.

3. The method according to claim 1, further comprising:
receiving the data information containing said WLAN address sent by said mobile terminal to a destination address via said WLAN; and
unpacking the data information containing said WLAN address and sending the unpacked data information to the destination address.

4. The method according to claim 3, further comprising:
receiving a report for canceling registration sent by said mobile terminal when said mobile terminal leaves said WLAN; and
deleting the mapping relationship between said WWAN address and said WLAN address of said mobile terminal in the network system according to said report for canceling registration.

5. The method according to claim 3, further comprising:
receiving a registration report sent by said mobile terminal when said mobile terminal enters another WLAN, wherein the registration report at least contains another WLAN address said mobile terminal acquires when said mobile terminal enters the another WLAN.

6. The method according to claim 4, wherein said registration report and said report for canceling registration can be transferred to the network system via either a WWAN link or a WLAN link.

7. A communication method performed by a mobile terminal with a WWAN address, for the mobile terminal to bilaterally switch communication between a WWAN and a WLAN via a mobility supporting module suitable to use with a mobility control module, the method comprising:
acquiring a WLAN address when entering the WLAN; and
sending a registration report to the WWAN network system, wherein the registration report at least contains the WLAN address;
wherein the WWAN network system establishes a mapping relationship between the WWAN address and the WLAN address of the mobile terminal according to the registration report;
wherein the mobility supporting module enables a switch between the WWAN and WLAN, dynamically updates, the mapping relationship between the WWAN and WLAN based on when the mobile terminal enters or exits the WLAN, and enables the exchange of registration and/or cancellation reports between the WWAN and WLAN, either on a periodic or continuous basis, by providing updated WWAN and WLAN address information via one or more encapsulating techniques;
wherein the mobile terminal has (i) an invariable address in WWAN and (ii) a different WLAN address with each entry into a different WLAN; and
wherein the MCM is incorporated within the MT and the MSM is placed within the WWAN such that two types of information is exchanged between the MCM and MSM, that is, control messages including the registration and/ or cancellation reports and data traffic for carrying data packets sent by the MT to an external source via the MSM.

8. The method according to claim 7, further comprising:
sending a report for canceling registration to said WWAN network system so as to notify said WWAN network system that said WLAN address of the mobile terminal is invalid when the mobile terminal leaves said WLAN.

9. The method according to claim 8, wherein said registration report and said report for canceling registration can be transferred to said network system via one, of WWAN link and WLAN link.

10. The method according to claim 9, further comprising:
receiving the data information containing said WLAN address transferred via said WWAN network system from a source address, wherein said WLAN address is encapsulated in the data information by said WWAN network system; and
unpacking the received data information so as to get the data information from the source address.

11. The method according to claim 10, further comprising:
encapsulating said WLAN address into the data information to be sent to a destination address; and
sending the data information containing said WLAN address to said WWAN network system, so as to send the data information unpacked by said WWAN network system to the destination address.

12. A WWAN network system, which enables a mobile terminal with a WWAN address in the WWAN to bilaterally switch communication between the WWAN and a WLAN via a mobility supporting module suitable to use with a mobility control module, the system comprising:
a receiving unit, for receiving a registration report from the mobile terminal when the mobile terminal enters the WLAN, wherein the registration report at least contains a WLAN address that the mobile terminal acquires when the mobile terminal enters the WLAN; and
an establishing unit, for establishing a mapping relationship between the WWAN address and the WLAN address of the mobile terminal according to the registration report;
wherein the mobility supporting module enables a switch between the WWAN and WLAN, dynamically updates the mapping relationship between the WWAN and WLAN based on when the mobile terminal enters or exits the WLAN, and enables the exchange of registration and/or cancellation reports between the WWAN and WLAN, either on a periodic or continuous basis, by providing updated WWAN and WLAN address information via one or more encapsulating techniques;
wherein the mobile terminal has (i) an invariable address in WWAN and (ii) a different WLAN address with each entry into a different WLAN; and
wherein the MCM is incorporated within the MT and the MSM is placed within the WWAN such that two types of information is exchanged between the MCM and MSM, that is, control messages including the registration and/ or cancellation reports and data traffic for carrying data packets sent by the MT to an external source via the MSM.

13. The WWAN network system according to claim 12, further comprising:
an encapsulating unit, for encapsulating said WLAN address into the data information to be sent to said mobile terminal according to the mapping relationship between said WWAN address and said WLAN address when receiving the data information from a source address to be sent to said mobile terminal; and a sending unit, for sending the data information containing said WLAN address to said mobile terminal via said WLAN.

14. The WWAN network system according to claim 12, further comprising:

a unpacking unit, for when receiving the data information containing said WLAN address sent to a destination address by said mobile terminal via said WLAN, unpacking the data information containing said WLAN address and sending the unpacked data information to the destination address.

15. The WWAN network system according to claim 14, further comprising:

a deleting unit, for when receiving a report for canceling registration sent by said mobile terminal when said mobile terminal leaves said WLAN, deleting the mapping relationship between said WWAN address and said WLAN address of said mobile terminal in the network system according to the report for canceling registration.

16. The WWAN network system according to claim 15, further comprising:

an updating unit, for when receiving a registration report sent by said mobile terminal as said mobile terminal enters another WLAN, updating the mapping relationship between said WWAN address and said WLAN address of said mobile terminal to the mapping relationship between said WWAN address and the another WLAN address according to the registration report, wherein the registration report at least contains the another WLAN address that said mobile terminal acquires when said mobile terminal enters the another WLAN.

17. A mobile terminal with a WWAN address in a WWAN, capable of bilaterally switching communication between the WWAN and a WLAN via a mobility supporting module suitable to use with a mobility control module, the mobile terminal, the mobile terminal comprising:

a receiving unit, for receiving a WLAN address when the mobile terminal enters the WLAN; and a sending unit, for sending a registration report to the WWAN network system, wherein the registration report at least contains the WLAN address;

wherein the WWAN network system establishes a mapping relationship between the WWAN address and the WLAN address of the mobile terminal according to the registration report;

wherein the mobility supporting module enables a switch between the WWAN and WLAN, dynamically updates the mapping relationship between the WWAN and WLAN based on when the mobile terminal enters or exits the WLAN, and enables the exchange of registration and/or cancellation reports between the WWAN and WLAN, either on a periodic or continuous basis, by providing updated WWAN and WLAN address information via one or more encapsulating techniques;

wherein the mobile terminal has (i) an invariable address in WWAN and (ii) a different WLAN address with each entry into a different WLAN; and wherein the MCM is incorporated within the MT and the MSM is placed within the WWAN such that two types of information is exchanged between the MCM and MSM, that is, control messages including the registration and/or cancellation reports and data traffic for carrying data packets sent by the MT to an external source via the MSM.

18. The mobile terminal according to claim 17, wherein:

said sending unit sends a report for canceling registration to said WWAN network system to notify said WWAN network system that said WLAN address of the mobile terminal is invalid when the mobile terminal leaves said WLAN.

19. The mobile terminal according to claim 18, wherein:

said receiving unit receives the data information containing said WLAN address transferred via said WWAN network system from a source address, wherein said WLAN address is encapsulated in the data information by said WWAN network system;

a unpacking unit unpacks the received data information to get the data information from the source address.

20. The mobile terminal according to claim 19, further comprising:

an encapsulating unit, for encapsulating said WLAN address into the data information to be sent to a destination address;

said sending unit, sends the data information containing said WLAN address to said WWAN network system, so as to send the data information unpacked by said WWAN network system to the destination address.

* * * * *